United States Patent [19]

Munz

[11] 4,420,135
[45] Dec. 13, 1983

[54] SUPPORT PLATE

[76] Inventor: Erich Munz, Weststrasse 1, 5204 Lohmar 1 - Geber, Fed. Rep. of Germany

[21] Appl. No.: 212,909

[22] Filed: Dec. 4, 1980

[30] Foreign Application Priority Data

Dec. 7, 1979 [DE] Fed. Rep. of Germany ....... 2949295

[51] Int. Cl.³ ............................................ F16M 13/00
[52] U.S. Cl. ................................................... 248/633
[58] Field of Search ............................... 248/631–633, 248/634

[56] References Cited

U.S. PATENT DOCUMENTS

| 2,546,354 | 3/1951 | Harmon | 248/633 |
| 2,914,275 | 11/1959 | Mitchell | 248/633 |
| 3,311,331 | 3/1967 | Steimen | 248/633 |
| 3,436,042 | 4/1969 | Van Goubergen | 248/633 |
| 4,066,234 | 12/1978 | Nycum | 248/633 |

FOREIGN PATENT DOCUMENTS 712422   3/1931   France ................................ 248/631

Primary Examiner—Alexander Grosz
Assistant Examiner—Michael F. Trettel
Attorney, Agent, or Firm—Kurt Kelman

[57] ABSTRACT

A shape-stable metal plate at the bottom side thereof is provided with at least one flexible pad napped at the side facing the floor, with the pad at the side provided with naps by way of longitudinal and/or transverse webs and edge-defing webs being shaped to form single chambers open to the bottom and with the naps having a lower height than the bearing surface of the webs.

3 Claims, 2 Drawing Figures

U.S. Patent
Dec. 13, 1983
4,420,135
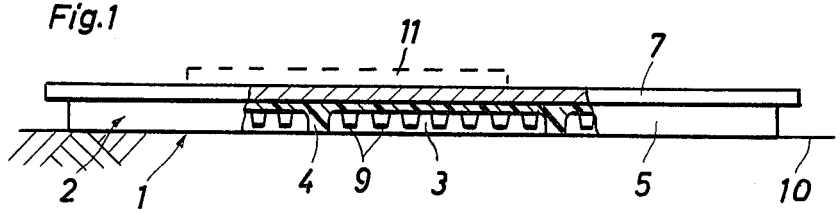
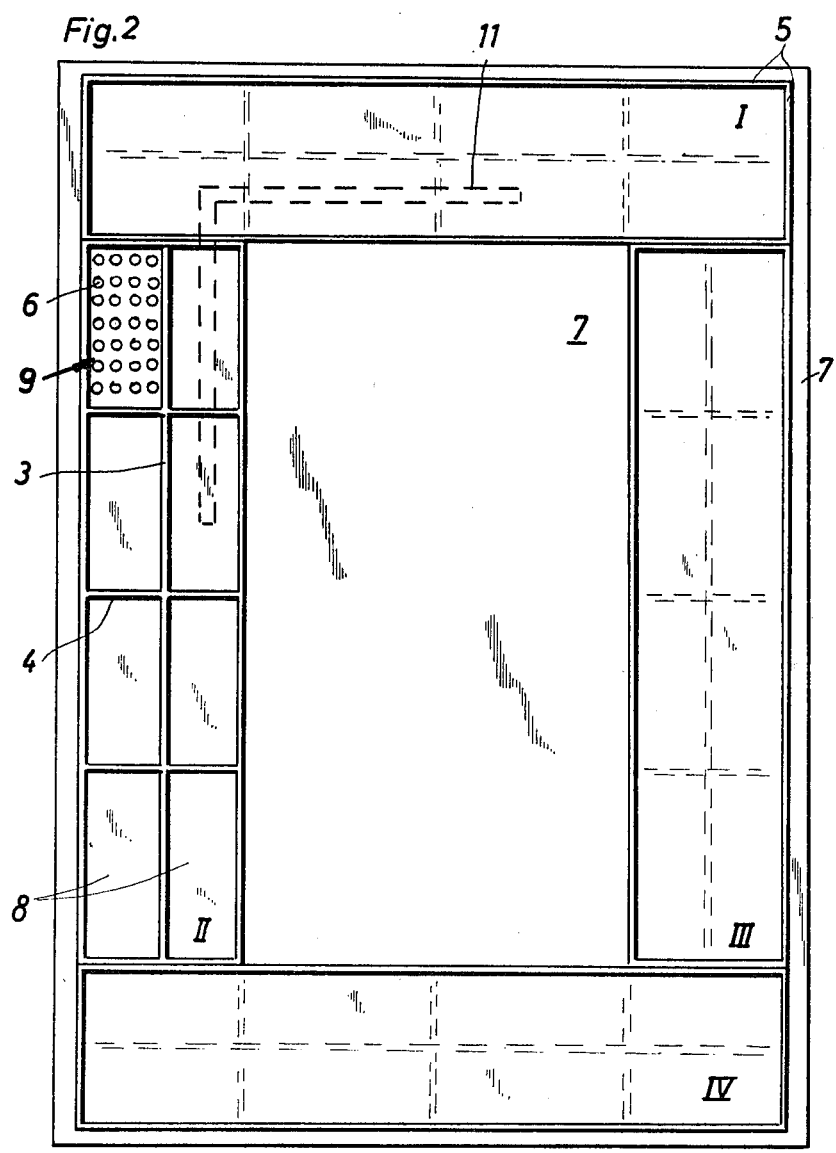

SUPPORT PLATE

This invention is concerned with a support plate, especially for working machines causing vibration, such as pumps, machine tools, punchers etc., comprising a load distributing, shape-stable metal support which at the bottom side over the whole surface or part thereof is coated with a vibration and noise dampening material in the form of a pad provided with naps directed toward the floor.

Such plates are generally known and serve to support machines of the type referred to above and also, for example, boilers and devices inasmuch as the operation thereof causes noises and vibrations. This state of art is represented, for example, by the following literature references: CH Pat. No. 172 796 and U.S. Pat. Nos. 2,031,950, 3,436,042 and 4,002,315.

The machines and devices, respectively by way of suitable elements are rigidly connected to the load distributing steel plate with the whole unit remaining non-connected over the bottom that must, of course, have a corresponding load carrying capacity so that the whole unit is readily portable.

No special foundation for the machine and devices, respectively, will be required when using such supporting plates.

Inasmuch as only the corners of such machines and devices, respectively, are lined with correspondingly smaller corner support plates, as a rule, no fixed connection to the base of the machine or equipment is established. However, fixed connections of such corner supports are equally known.

The vibration and noise absorption of such prior known elements per se is more or less satisfactory. However, in case of heavy loads and strong horizontal accelerations especially the lateral stability and thus the serviceability of such supporting plates leaves a great deal to be desired. It is the object of the present invention to improve a support plate of the type referred to above to the effect that the lateral stability but also the all-over dampening effect of such plates be improved and increased, respectively.

This problem according to the invention is solved by a support plate of the afore-mentioned type in that the face of at least one pad at the nap side by way of longitudinal and/or transverse webs and by edge-defining webs is shaped to form single chambers open toward the bottom, with the naps having a lower height than the support face of the webs.

On account of the subdivision according to the invention by means of transverse and/or longitudinal webs the bottom-sided support face of the pad when placed onto the planar bottom face is subdivided so-to-speak into air-tight single chambers to thereby prevent the air from escaping so that the air as a compressed air cushion carries part of the load which, on the other hand, to a certain degree relieves the resilient material so that it can better perform its dampening function.

The subdivision into a plurality of single chambers advantageously safeguards that, depending on the floor conditions, always at least some air-tight chambers are formed which, as a rule, will not be the case with only one single peripheral web extending along the entire periphery of the plate, with a minor floor unevenness, for example, at only one point, being sufficient to act as a blow-off opening for the air under the plate so that the air cannot perform a carrier function.

One embodiment of the invention will be described, by way of example, with reference to the accompanying drawings, in which FIG. 1 is a lateral view, partly in section, of the support plate;

FIG. 2 is a bottom-sided view of the support plate.

As revealed by FIGS. 1,2, metal plate 7 preferably made of steel at the bottom side is coated with a pad which in the indicated example of embodiment is formed of four equal-sized and equally structurized individual elements (I–IV). The nap and web structure for the sake of simplicity has been shown only at the single pad II, left-hand side, top. The individual pads made, for example, of rubber that can all be made with the same negative form from the bottom are secured against steel plate 7 by way of a suitable adhesive.

Each individual pad I–IV includes peripheral edge defining webs 5 and crossing longitudinal and cross webs 3,4, with naps 9 being disposed on the bottoms of the individual chambers 8 as formed and with the support faces 6 of said naps according to FIG. 1 in case of a nonloaded support on the bottom face 10 are disposed at a slightly higher level than the latter.

Thus webs 3,4 and 5 are firmly pressed under load to the floor tightly sealing the individual chambers 8. Support face 6 of naps 9 only after a corresponding compression of the webs get into contact with the floor and are thus slightly less under pressure.

The web structure as demonstrated is not imperative, i.d. the individual chamber 8 also can be formed as honeycombs, squares, triangles, circles or the like.

The support plate can, of course, be of different sizes; for example, it can be so dimensioned that the whole machine to be placed thereon has sufficent space thereon. Also, it is possible to size the support plate essentially smaller so that then it will be used in numbers of four as corner supports for the machines to be erected. In that case, feasibly, an angle 11 as shown in broken lines in FIGS. 1,2, is provided on the surface of the support plate that can also be made, for example, of aluminium die casting.

What I claim is:

1. A vibration- and sound-absorbing support for mounting a machine on a base, the support comprising
   (a) a load distributing and shape-retaining metal carrier having a top side for supporting the machine and a bottom side facing the base, and
   (b) at least one pad of a vibration- and sound-absorbing material laminated to the bottom side of the metal carrier and disposed between the bottom side and the base, the pad comprising
      (1) circumferential webs and intersecting webs between the circumferential webs, the webs contacting the base and defining a plurality of separate open chambers facing the base, and
      (2) a plurality of protuberances in each one of the chambers, the protuberances projecting from the pad towards the base and having a height lower than that of the webs.

2. The machine-mounting support of claim 1, wherein the pad is rectangular and the intersecting webs extend perpendicularly to each other and parallel to the sides of the rectangular pad.

3. The machine-mounting support of claim 1, comprising a plurality of like ones of said pads, the paids extending around the circumference of the metal carrier.

* * * * *